(12) United States Patent
Wang et al.

(10) Patent No.: US 11,988,847 B2
(45) Date of Patent: May 21, 2024

(54) OPTICAL ELEMENT DRIVING MECHANISM

(71) Applicant: TDK TAIWAN CORP., Taoyuan (TW)

(72) Inventors: Yun-Fei Wang, Taoyuan (TW);
Yu-Huai Liao, Taoyuan (TW);
Sheng-Zong Chen, Taoyuan (TW);
Wei-Han Hsia, Taoyuan (TW);
Kun-Shih Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 197 days.

(21) Appl. No.: 17/385,627

(22) Filed: Jul. 26, 2021

(65) Prior Publication Data

US 2022/0035174 A1 Feb. 3, 2022

Related U.S. Application Data

(60) Provisional application No. 63/058,932, filed on Jul. 30, 2020.

(51) Int. Cl.
*G02B 27/64* (2006.01)
*G02B 7/00* (2021.01)
(Continued)

(52) U.S. Cl.
CPC .......... *G02B 27/646* (2013.01); *G02B 7/005* (2013.01); *G02B 7/02* (2013.01); *G02B 7/1805* (2013.01); *G02B 7/182* (2013.01)

(58) Field of Classification Search
CPC ........ G02B 27/646; G02B 7/005; G02B 7/02; G02B 7/1805; G02B 7/182;
(Continued)

(56) References Cited

U.S. PATENT DOCUMENTS

2015/0002683 A1* 1/2015 Hu .................... G03B 17/17
348/208.11
2019/0243156 A1* 8/2019 Park ................... G03B 17/17
(Continued)

FOREIGN PATENT DOCUMENTS

WO WO-2021246708 A1 * 12/2021 ............ G02B 27/646

OTHER PUBLICATIONS

Machine translation of WO-2021246708-A1 (Year: 2021).*

*Primary Examiner* — Darryl J Collins
*Assistant Examiner* — Matthew Y Lee
(74) *Attorney, Agent, or Firm* — MUNCY, GEISSLER, OLDS & LOWE, P.C.

(57) ABSTRACT

An optical element driving mechanism is provided. The optical element driving mechanism includes a fixed portion, a first movable portion, a second movable portion, a first driving assembly, and a second driving assembly. The first movable portion is movable relative to the fixed portion. The second movable portion is used for holding an optical element having a main axis, and is movable relative to the first movable portion. The first driving assembly is used for driving the first movable portion to move in a first dimension relative to the fixed portion, and the second driving assembly is used for driving the second movable portion to move in a second dimension relative to the fixed portion. The first dimension and the second dimension are different.

17 Claims, 12 Drawing Sheets

(51) Int. Cl.
  *G02B 7/02* (2021.01)
  *G02B 7/18* (2021.01)
  *G02B 7/182* (2021.01)

(58) Field of Classification Search
  CPC .. G02B 13/0065; G02B 26/0816; G02B 7/09; H02K 2201/18; H02K 11/215; H02K 41/0358; G03B 5/00; G03B 13/36
  See application file for complete search history.

(56) References Cited

U.S. PATENT DOCUMENTS

| | | | |
|---|---|---|---|
| 2020/0400464 A1* | 12/2020 | Yedid | G03B 37/02 |
| 2022/0269146 A1* | 8/2022 | Lee | H04N 23/51 |
| 2023/0251502 A1* | 8/2023 | Kwon | G03B 30/00 |
| | | | 359/555 |

* cited by examiner

OPTICAL ELEMENT DRIVING MECHANISM

CROSS REFERENCE TO RELATED APPLICATIONS

This application claims the benefit of U.S. Provisional Application No. 63/058,932, filed on Jul. 30, 2020, the entirety of which is incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided. The optical element driving mechanism includes a fixed portion, a first movable portion, a second movable portion, a first driving assembly, and a second driving assembly. The first movable portion is movable relative to the fixed portion. The second movable portion is used for holding an optical element having a main axis, and is movable relative to the first movable portion. The first driving assembly is used for driving the first movable portion to move in a first dimension relative to the fixed portion, and the second driving assembly is used for driving the second movable portion to move in a second dimension relative to the fixed portion. The first dimension and the second dimension are different.

In some embodiments, a movement on the first dimension is a rotational movement of the first movable portion relative to a first axis extending in a first direction. A movement on the second dimension is a circular movement of the second movable portion relative to a second axis extending in a second direction. The first direction and the second direction are different. The first axis passes through the second movable portion. The second axis does not pass through the second movable portion. The main axis is not parallel to the first direction. The main axis is not parallel to the second direction. The optical element and the second movable portion are arranged along the main axis.

In some embodiments, the first direction and the second direction are perpendicular. The second movable portion includes a holding plane perpendicular to the main axis. When the second movable portion moves relative to the first movable portion in the second dimension, the holding plane is perpendicular to the main axis.

In some embodiments, the first movable portion includes a first plane, a second plane, and a third plane. The first plane faces the second movable portion. The second plane faces the second movable portion. The third plane faces the second movable portion. The first plane and the second plane are different. The first plane and the third plane are different.

In some embodiments, a first recess is formed on the first plane. A second recess is formed on the second plane. A third recess is formed on the third plane. The first recess has an arc-shape with the second axis as a central axis. The second recess has an arc-shape with the second axis as a central axis. The third recess has an arc-shape with the second axis as a central axis.

In some embodiments, the first plane and the second plane are perpendicular. The first plane and the third plane are perpendicular. The second plane and the third plane are parallel.

In some embodiments, the first guiding recess has a first radius of curvature. The second guiding recess has a second radius of curvature. The third guiding recess has a third radius of curvature. The first radius of curvature and the second radius of curvature are different. The first radius of curvature and the third radius of curvature are different. The second radius of curvature and the third radius of curvature are different. When viewed along the second axis, the first guiding recess, the second guiding recess, and the third guiding recess do not overlap each other.

In some embodiments, the optical element driving mechanism further includes a first guiding assembly including a first guiding element, a second guiding element, and a third guiding element, wherein: the first guiding element is affixed on the second movable portion and movably disposed on the first guiding recess. The second guiding element is affixed on the second movable portion and movably disposed on the second guiding recess. The third guiding element is affixed on the second movable portion and movably disposed on the third guiding recess.

In some embodiments, the first guiding element is spherical. The second guiding element is spherical. The third guiding element is spherical; in a third direction that is perpendicular to the second plane, a distance between the second guiding element and the fixed portion is different from a distance between the third guiding element and the fixed portion.

In some embodiments, in the third direction, the distance between the second guiding element and the fixed portion is less than the distance between the third guiding element and the fixed portion.

In some embodiments, the first driving assembly includes a first magnetic element and a first driving coil. The first magnetic element is disposed on the first movable portion. The first driving coil is disposed on the fixed portion. The first driving coil has an arc-shape with the first axis as the central axis.

In some embodiments, the second driving assembly includes a second magnetic element and a second driving coil. The second magnetic element is disposed on the second movable portion. The second driving coil is disposed on the first movable portion. At least a portion of the second magnetic element protrudes from the second movable portion.

In some embodiments, the optical element driving mechanism further includes a third magnetic element disposed on the second movable portion used for generating a fixing force with the first magnetic element, the fixing force applies on the second movable portion to affix the position of the second movable portion relative to the first movable portion in a direction that the second axis extends.

In some embodiments, the third magnetic element and the first guiding element are disposed on opposite sides of the second movable portion. The fixed portion further includes fourth plane. A fourth guiding recess and a fifth guiding recess are formed on the fourth plane. The fourth guiding recess has an arc-shape with the first axis as the central axis. The fifth guiding recess has an arc-shape with the first axis as the central axis.

In some embodiments, the fourth guiding recess has a fourth radius of curvature. The fifth guiding recess has a fifth radius of curvature. The fourth radius of curvature and the fifth radius of curvature are different. The length of the fourth guiding recess and the length of the fifth guiding recess are different.

In some embodiments, the optical element driving mechanism further includes a second guiding assembly including a fourth guiding element, a fifth guiding element, and a sixth guiding element affixed on the first movable portion. The fourth guiding recess includes a first guiding recess endpoint and a second guiding recess endpoint. The fifth guiding recess includes a third guiding recess endpoint and a fourth guiding recess endpoint. A distance between the fourth guiding element and the first guiding recess endpoint is different from a distance between the fifth guiding element and the third guiding recess endpoint.

In some embodiments, a distance between the fourth guiding element and the second guiding recess endpoint is different from a distance between the sixth guiding element and the fourth guiding recess endpoint. A first connecting line passes the first axis and the first guiding recess endpoint, a second connecting line passes the first axis and the second guiding recess endpoint, and an angle between the first connecting line and the second connecting line is between 10 degrees to 90 degrees.

In some embodiments, the distance between the fourth guiding element and the first guiding recess endpoint is less than the distance between the fifth guiding element and the third guiding recess endpoint. The distance between the fourth guiding element and the second guiding recess endpoint is less than the distance between the sixth guiding element and the fourth guiding recess endpoint.

In some embodiments, the first guiding element, the second guiding element, the fourth guiding element, the fifth guiding element, and the sixed guiding element do not overlap each other when viewed in the first direction. A first virtual plane is parallel to the direction. The first virtual plane passes the second guiding element, the third guiding element, and the fourth guiding element. A distance between the first guiding element and the first virtual plane is different from distances between the first virtual plane to the fifth guiding element or the sixth guiding element.

In some embodiments, the optical element driving mechanism further includes a resilient element disposed between the first movable portion and the fixed portion used for providing a stabilize force to the first movable portion relative to the fixed portion, wherein: the direction of the stabilize force is different from the direction of a first driving force applied to the first movable portion from the first driving assembly. The direction of the stabilize force is different from the direction of the fixing force.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
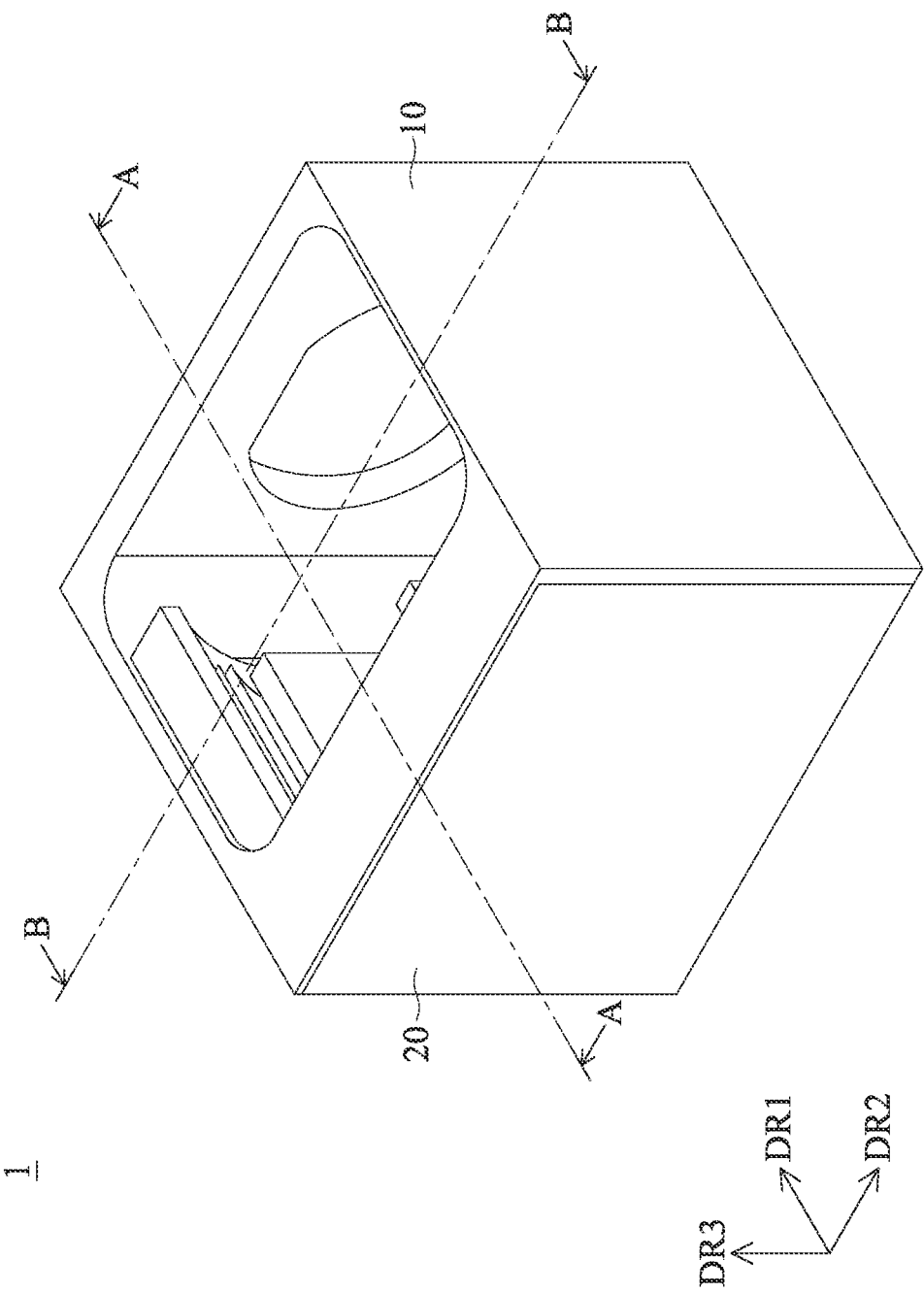
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
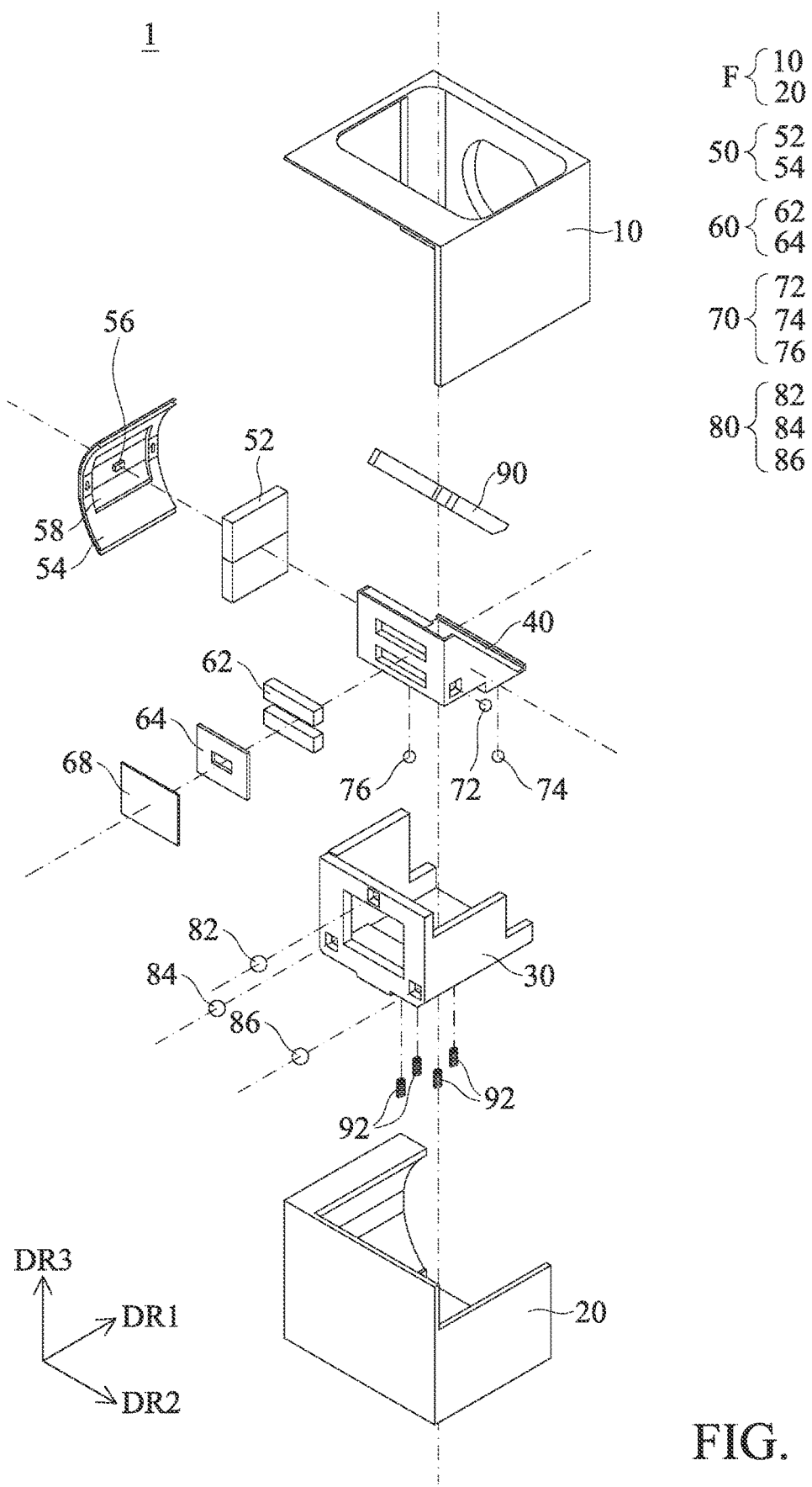
FIG. 2 is an exploded view of an optical element driving mechanism in some embodiments of the present disclosure.
Figure 3:
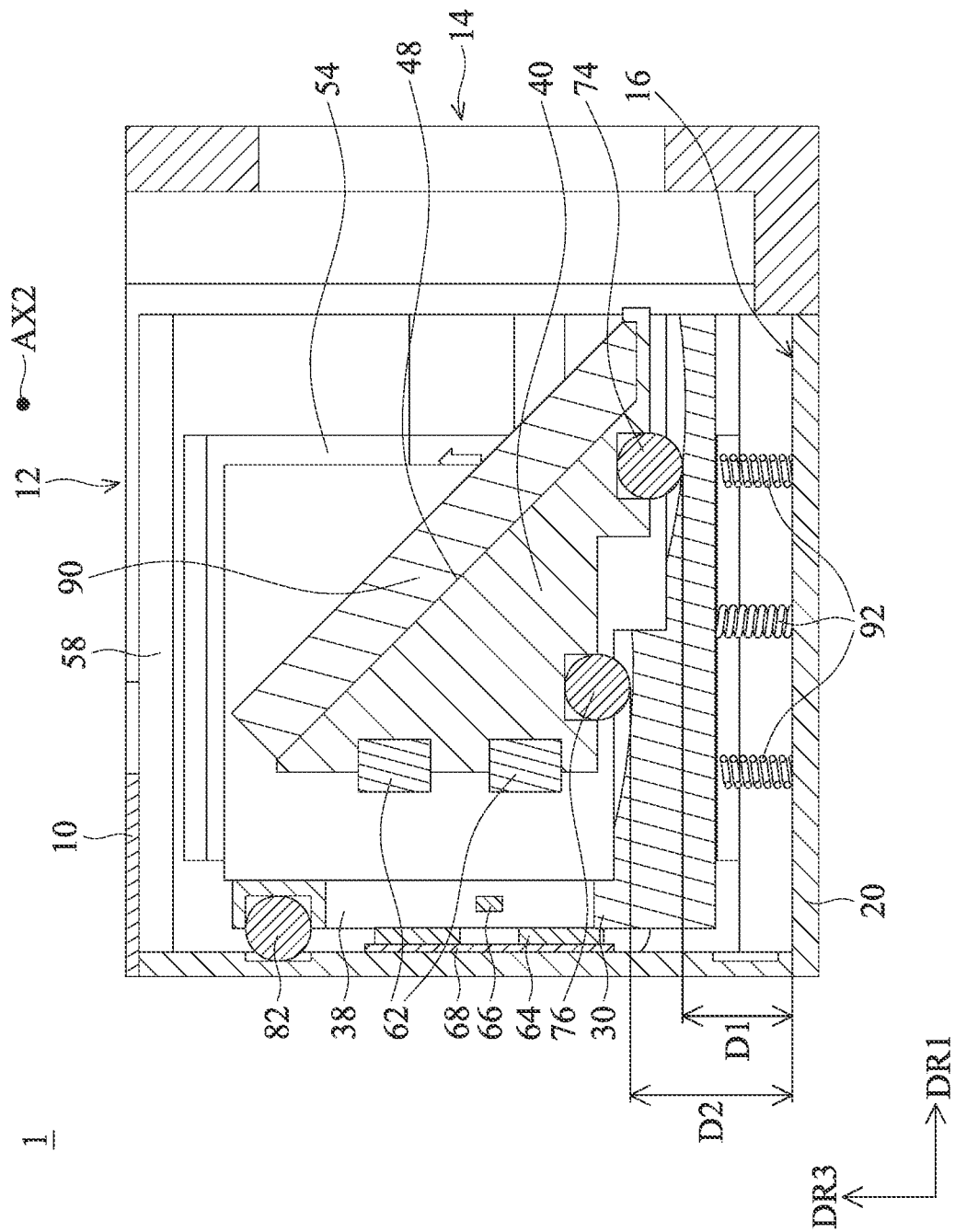
FIG. 3 and FIG. 4 are cross-sectional views illustrated along a line A-A and a line B-B in FIG. 1.
Figure 4:
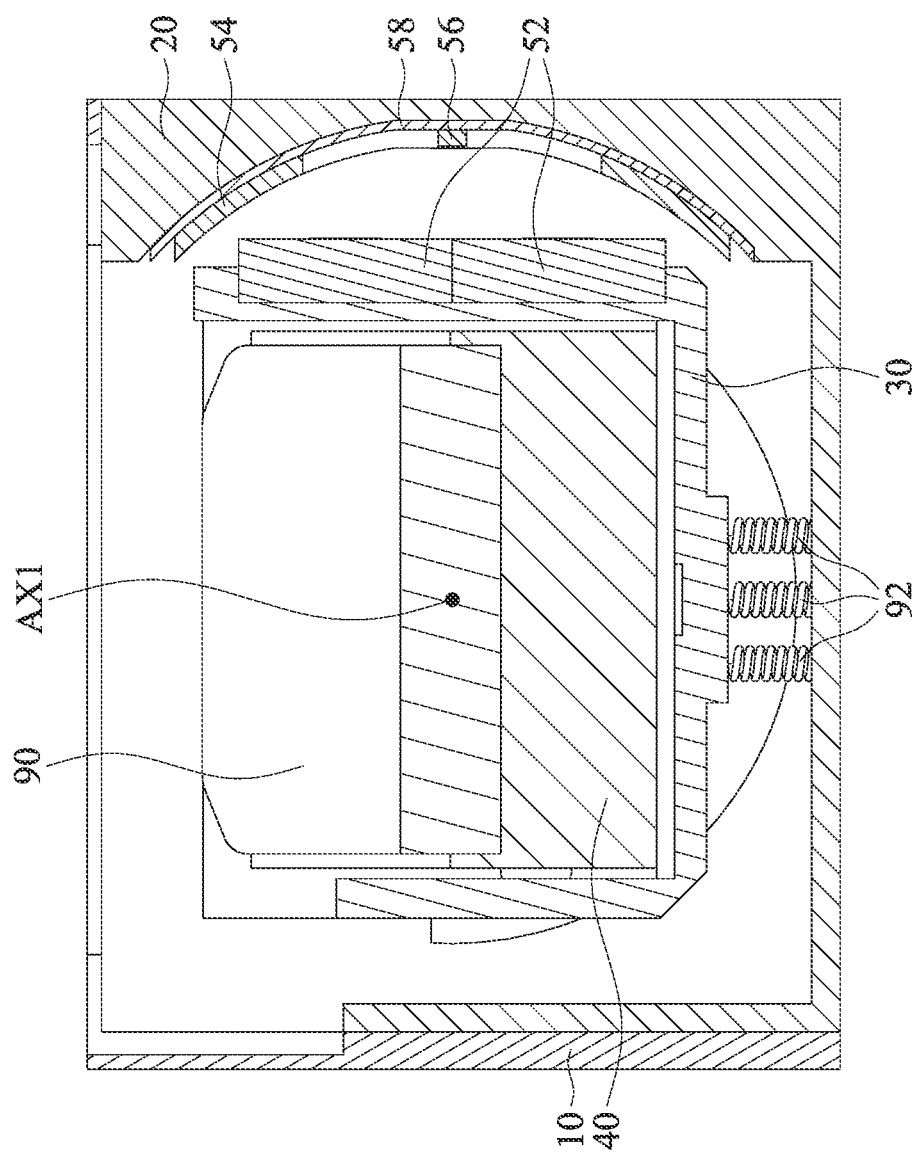

FIG. 1 is a schematic view of an optical element driving mechanism 1 in some embodiments of the present disclosure. FIG. 2 is an exploded view of an optical element driving mechanism 1 in some embodiments of the present disclosure. FIG. 3 and FIG. 4 are cross-sectional views illustrated along a line A-A and a line B-B in FIG. 1, wherein FIG. 3 is a cross-sectional view illustrated along second direction DR2, and FIG. 4 is a cross-sectional view illustrated along first direction DR1. The first direction DR1 and the second direction DR2 are different (e.g. perpendicular). Moreover, third direction DR3 may perpendicular to the first direction DR1 and the second direction DR2.

In some embodiments, as shown in FIG. 1 to FIG. 4, the optical element driving mechanism may mainly include a case 10, a bottom 20, a first movable portion 30, a second movable portion 40, a first driving assembly 50 (includes a first magnetic element 52 and a first driving coil 54), a first position sensor 56, a first substrate 58, a second driving assembly 60 (includes a second magnetic element 62 and a second driving coil 64), a second position sensor 66, a second substrate 68, a first guiding assembly 70 (includes a first guiding element 72, a second guiding element 74, and a third guiding element 76), a second guiding assembly 80 (includes a fourth guiding element 82, a fifth guiding element 84, and a sixth guiding element 86), and a resilient element 92 arranged in the third direction DR3.

The optical element driving mechanism 1 may be used for holding a optical element 90, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

The case 10 and the bottom 20 may be combined to form a shell of the optical element driving mechanism 1. For example, the bottom 20 may be affixed on the case 10. Therefore, the case 10 and the bottom 20 may be called as a fixed portion F. It should be noted that a first opening 12 and a second opening 14 may be formed on the case 10, and the first opening 12 and the second opening 14 are formed on adjacent sides of the case 10. For example, the first opening 12 and the optical element 90 may arrange on the third direction DR3, and the second opening 14 and the optical element 90 may arrange on the first direction DR1. In some embodiments, external light may achieve optical element 90 through the first opening 12, and be reflected by the optical element 90 to exit from the second opening 14. Alternatively, external light may achieve optical element 90 through the second opening 14, and be reflected by the optical element 90 to exit from the first opening 12. Therefore, the light path may be changed. The optical element driving mechanism 1 may be applied in a periscope camera module, so the thickness of the electronic device using such camera module may be reduced to achieve miniaturization.

In some embodiments, the optical element 90 may be affixed on the second movable portion 40. The second movable portion 40 is movably connected to the first movable portion 30, and the first movable portion 30 is movably connected to the fixed portion F (e.g. the bottom 20). Therefore, the first movable portion 30 may move relative to the fixed portion F, and the second movable portion 40 may move relative to the first movable portion 30 or the fixed portion F.

In some embodiments, the first driving assembly 50 may be used for driving the first movable portion 30 to move relative to the fixed portion F. For example, the first driving assembly 50 may include a first magnetic element 52 and a first driving coil 54 disposed on the first movable portion 30 and the fixed portion F, respectively. For example, the first magnetic element 52 may be disposed on a recess 37 of the first movable portion 30, and the first driving coil 54 may be disposed on the fixed portion F (e.g. the bottom 20). However, the present disclosure is not limited thereto. In other embodiments, the first magnetic element 52 may be disposed on the fixed portion F (e.g. the bottom 20), and the first driving coil 54 may be disposed on the first movable portion 30, depending on design requirement. Therefore, the first magnetic element 52 and the first driving coil 54 may generate an electromagnetic driving force to drive the first movable portion 30. Therefore, optical image stabilization may be achieved. In some embodiments, the first driving assembly 50 may also include piezoelectric element or shape memory alloy.

In some embodiments, as shown in FIG. 4, the first axis AX1 extends in the first direction DR1 and passes the second movable portion 40. The first driving coil 54 and the first substrate 58 may have arc shapes, wherein the first axis AX1 is their central axis. Therefore, the first driving assembly 50 applies a first driving force to the first movable portion 30 to drive the first movable portion 30 rotating with the first axis AX1 as the rotational axis (i.e. the movement in the first dimension).

In some embodiments, the first position sensor 56 may be affixed on the fixed portion F to detect the magnetic field variation of the first magnetic element 52 when the first movable portion 30 moving relative to the fixed portion F. Therefore, the position of the first movable portion 30 relative to the fixed portion F may be detected. In some embodiments, the first position sensor 56 may include a Hall Sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate Sensor.

In some embodiments, the first substrate 58 may be a flexible printed circuit (FPC), which may be affixed on the fixed portion F (the bottom 20) by adhesion. In some embodiments, the first substrate 58 is electrically connected other electronic elements inside or outside the optical element driving mechanism 1. For example, electronic signal may be provided to the first driving assembly 50 from the first substrate 58, so the movement of the first movable portion 30 in different directions may be controlled to achieve optical image stabilization.

In some embodiments, the second driving assembly 60 may be used for driving the second movable portion 40 to move relative to the first movable portion 30 or the fixed portion F. For example, the second driving assembly 60 may include a second magnetic element 62 and a second driving coil 64 disposed on the second movable portion 40 and the first movable portion 30, respectively. For example, the second magnetic element 62 may be disposed on the second movable portion 40, and the second driving coil 64 may be disposed on the first movable portion 30. However, the present disclosure is not limited thereto. In other embodiments, the second magnetic element 62 may be disposed on the first movable portion 30, and the second driving coil 64 may be disposed on the second movable portion 40, depending on design requirement. Therefore, the second movable portion 40 may be moved by the electromagnetic force generated between the second magnetic element 62 and the second driving coil 64. Therefore, optical image stabilization may be achieved. In some embodiments, as shown in FIG. 3, a portion of the second magnetic element 62 may be embedded in the second movable portion 40, and another portion of the second magnetic element 62 may protrude from the second movable portion 40. In some embodiments, the second driving assembly 60 may also include piezoelectric element or shape memory alloy.

In some embodiments, the second position sensor 66 may be disposed on the first movable portion 30 (e.g. disposed in a first movable portion 30) to detect the magnetic field variation of the second magnetic element 62 when the second movable portion 40 moving relative to the first movable portion 30. Therefore, the position of the second movable portion 40 relative to the first movable portion 30 may be detected. In some embodiments, the second position sensor 66 may include a Hall Sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate Sensor.

In some embodiments, the second substrate 68 may be a flexible printed circuit (FPC), which may be affixed on the fixed portion F (the bottom 20) by adhesion. In some embodiments, the second substrate 68 is electrically connected other electronic elements inside or outside the optical element driving mechanism 1. For example, electronic signal may be provided to the second driving assembly 60 from the second substrate 68, so the movement of the second movable portion 40 in different directions may be controlled to achieve optical image stabilization.

In some embodiments, the first guiding assembly 70 may be disposed between the first movable portion 30 and the second movable portion 40 to movably connect the first movable portion 30 and the second movable portion 40. For example, the first guiding assembly 70 may be affixed on the second movable portion 40 and movably connected to the first movable portion 30. In some embodiments, the first guiding assembly 70 may slide relative to the first movable portion 30.

In some embodiments, the second guiding assembly 80 may be disposed between the first movable portion 30 and the fixed portion F to movably connect the first movable portion 30 and the fixed portion F. For example, the second guiding assembly 80 may be affixed on the first movable portion 30 and movably connected to the fixed portion F. In some embodiments, the second guiding assembly 80 may slide relative to the fixed portion F.

In some embodiments, the resilient element 92 may be disposed between the first movable portion 30 and the fixed portion F to stabilize the first movable portion 30 relative to the fixed portion F, so the movable range of the first movable portion 30 relative to the fixed portion F may be defined.

Figure 5:
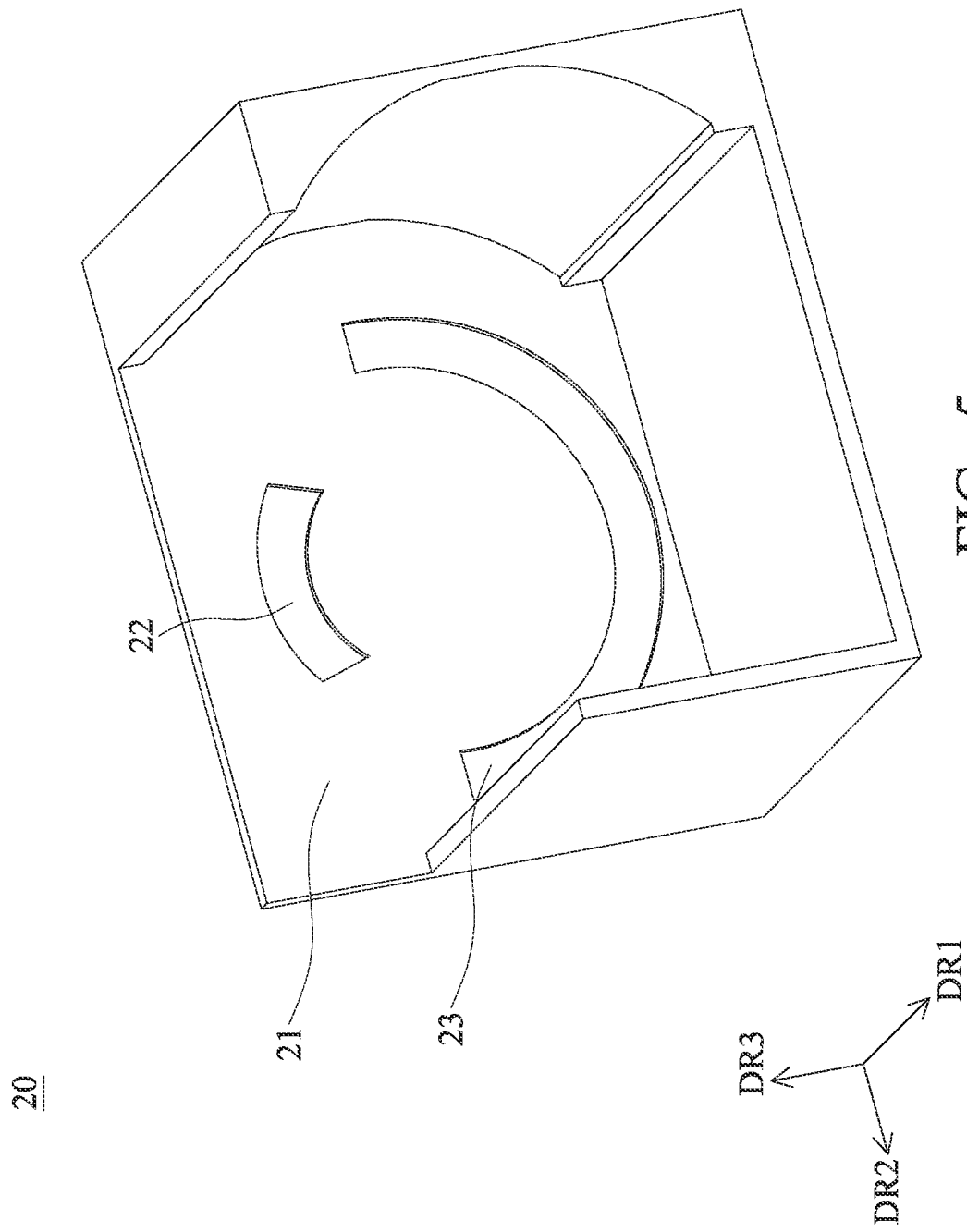
FIG. 5 is a schematic view of a bottom.

FIG. 5 is a schematic view of the bottom 20. The bottom 20 may include a fourth plane 21, and a fourth guiding recess 22 and a fifth guiding recess 23 may be formed on the fourth plane 21. In some embodiments, the second guiding assembly 80 may be disposed in the fourth guiding recess 22 and the fifth guiding recess 23 to define the movable range of the second guiding assembly 80, which will be described later in detail.

Figure 6:
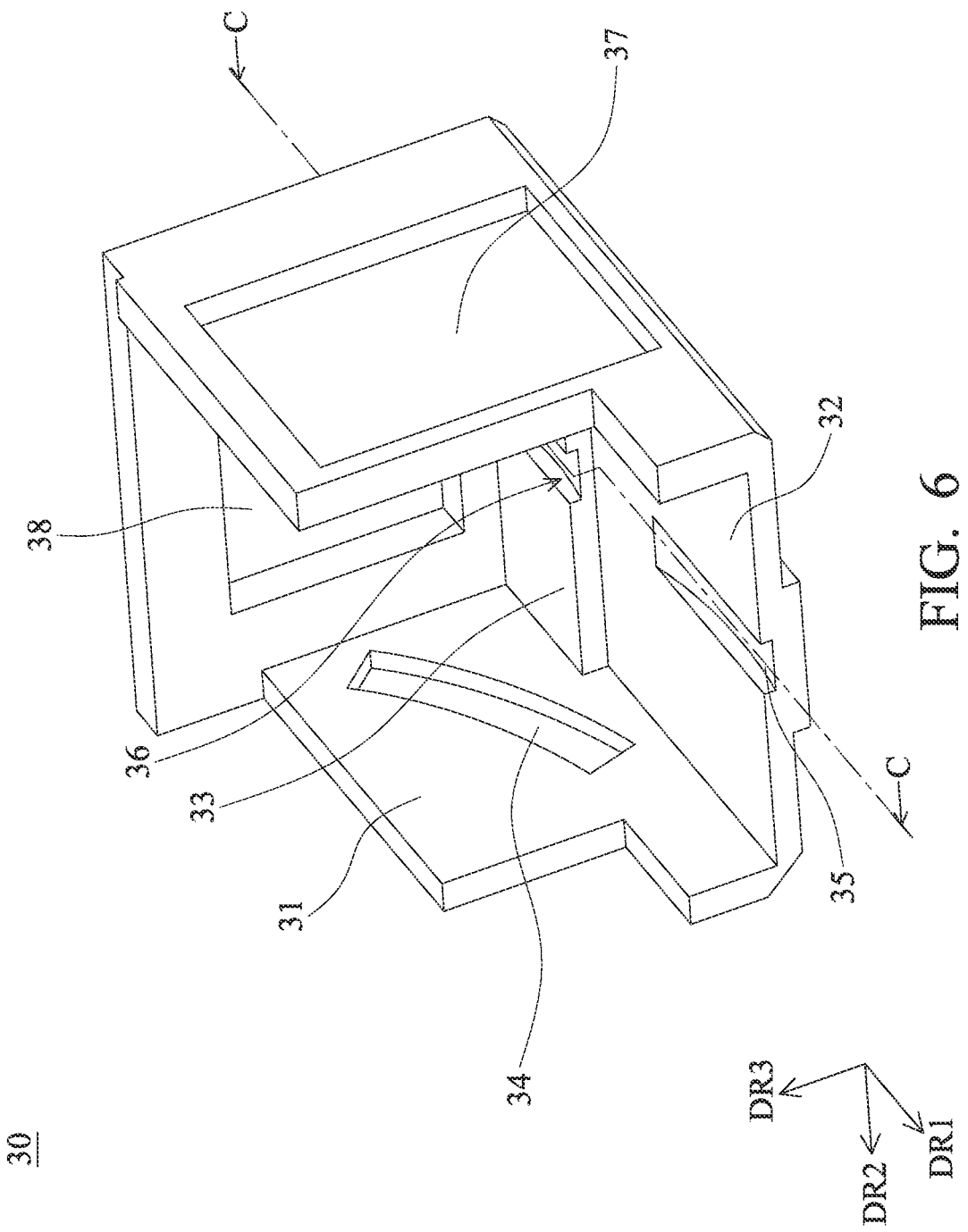
FIG. 6 is a schematic view of a first movable portion.
Figure 7:
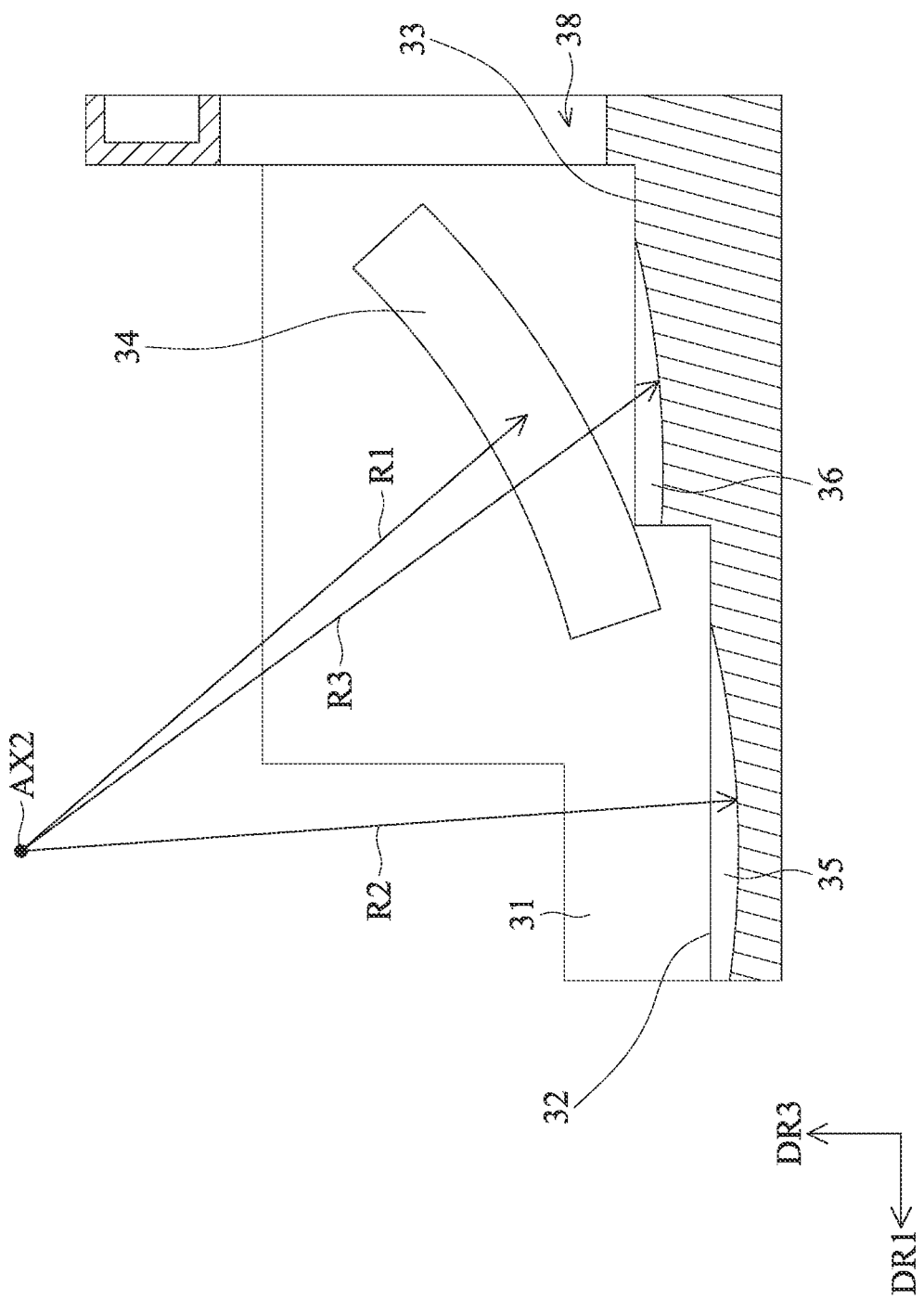
FIG. 7 is a cross-sectional view of the first movable portion illustrated along a line C-C in FIG. 6.

FIG. 6 is a schematic view of the first movable portion 30, and FIG. 7 is a cross-sectional view of the first movable portion 30 illustrated along a line C-C in FIG. 6. In some embodiments, the first movable portion 30 may include a first plane 31, a second plane 32, and a third plane 33. The first guiding recess 34 may form on the first plane 31, a second guiding recess 35 any form on the second plane 32, and a third guiding recess 36 any form on the third plane 33. In some embodiments, the vertical direction of the first plane 30 may be different from the vertical directions of the second plane 32 or the third plane 33, such as perpendicular each other. The second plane 32 and the third plane 33 may include an identical vertical direction. In some embodiments, the first plane 31, the second plane 32, and the third plane 33 may face the second movable portion 40. In some embodiments, the first movable portion 30 may include a recess 37 and an opening 38.

In some embodiments, as shown in FIG. 7, the first guiding recess 34, the second guiding recess 35, and the third guiding recess 36 may have arc shape with the second axis AX2 as their central axis when viewed along the second axis AX2. For example, the second axis AX2 may perpendicular to the first plane 31. The first guiding recess 34 may have a first radius of curvature R1, the second guiding recess 35 may have a second radius of curvature R2, and the third guiding recess 36 may have a third radius of curvature R3 relative to the second axis AX2. In some embodiments, the first radius of curvature R1, the second radius of curvature R2, and the third radius of curvature R3 are different. Moreover, when viewed along the second axis AX2, the first guiding recess 34, the second guiding recess 35, and the third guiding recess 36 do not overlap each other.

In some embodiments, as shown in FIG. 3, the second axis AX2 does not pass the second movable portion 40, and the second driving assembly 60 may be used for driving the second movable portion 40 to perform a circular motion relative to the first movable portion 30 with the second axis AX2 as the rotational axis (i.e. the movement in the second dimension), and the first dimension and the second dimension are different. It should be noted that the second movable portion 40 includes a holding plane 48 perpendicular to the main axis AX3. When the second movable portion 40 moves relative to the first movable portion 30 in the second dimension, the vertical direction of the holding plane 48 may be parallel to the main axis AX3. Therefore, the optical element 90 may face an identical direction when the optical element 90 moves with the second movable portion 40.

Moreover, in the third direction DR3, a first distance D1 is between the second guiding element 74 and the bottom 20, a second distance D2 is between the third guiding element 76 and the bottom 20, and the first distance D1 and the second distance D2 are different. For example, the first distance D1 may be less than the second distance D2.

Figure 8:
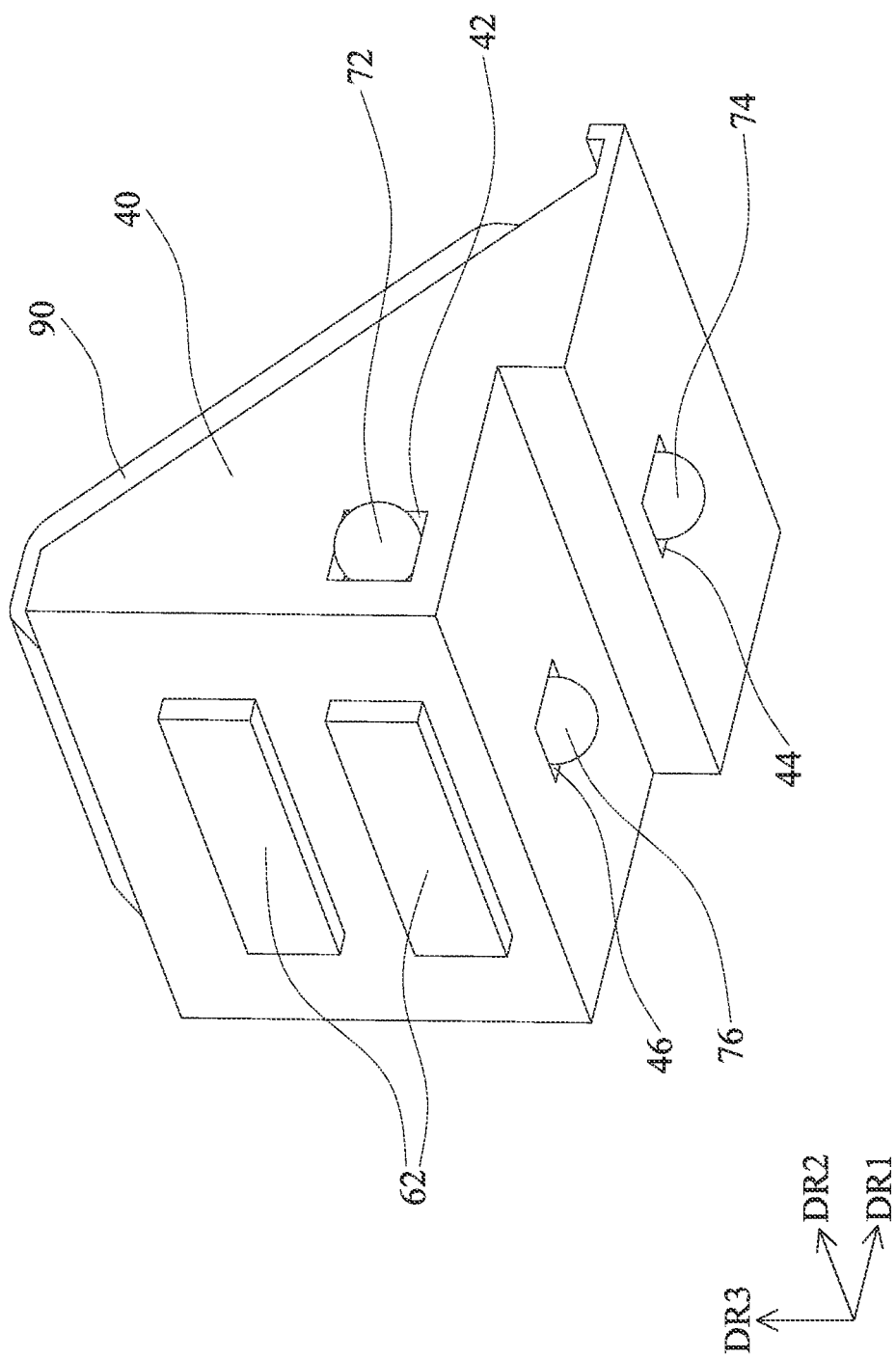
FIG. 8, FIG. 9, and FIG. 10 are schematic views of the optical element driving mechanism when viewed in different directions.
Figure 9:
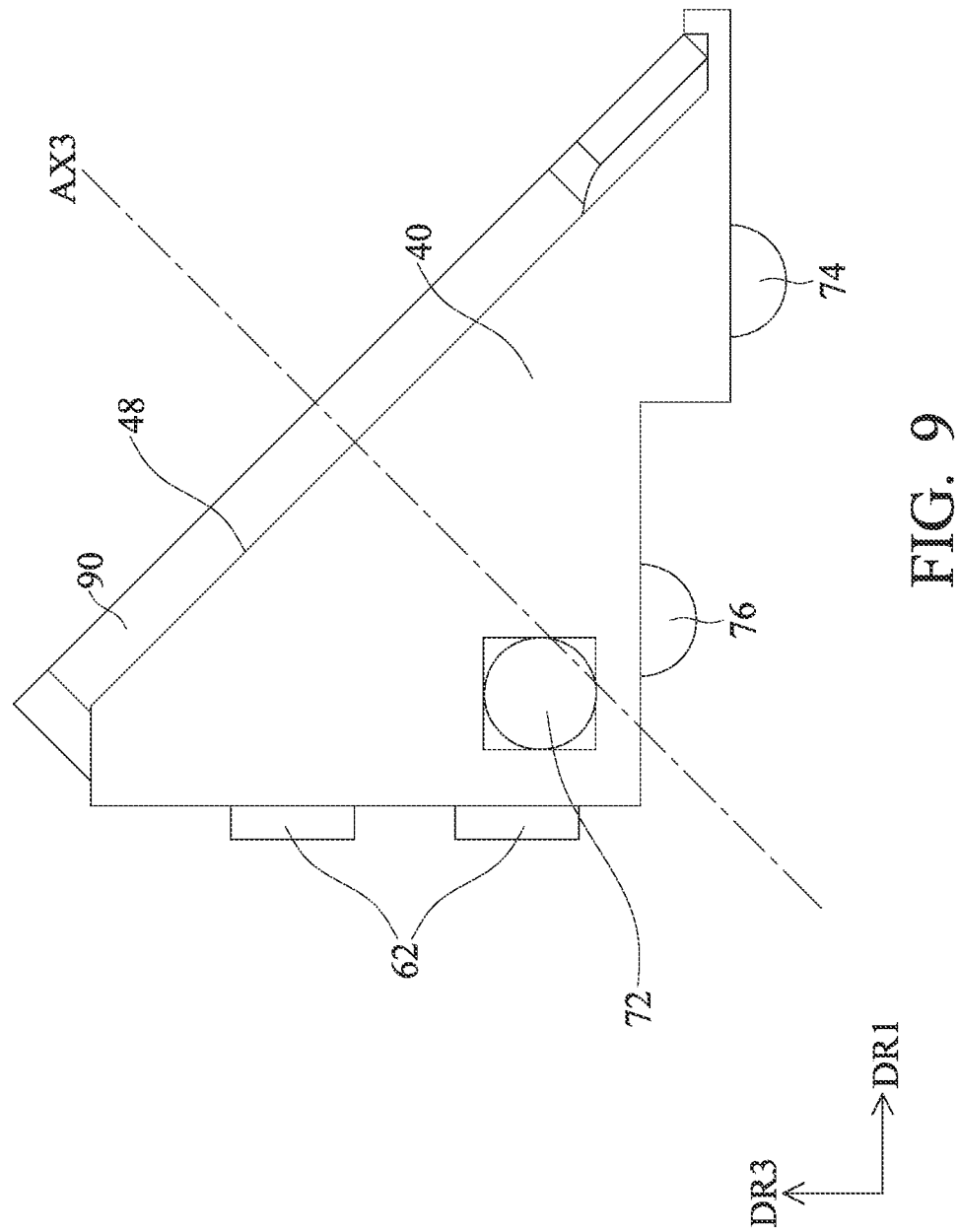
Figure 10:
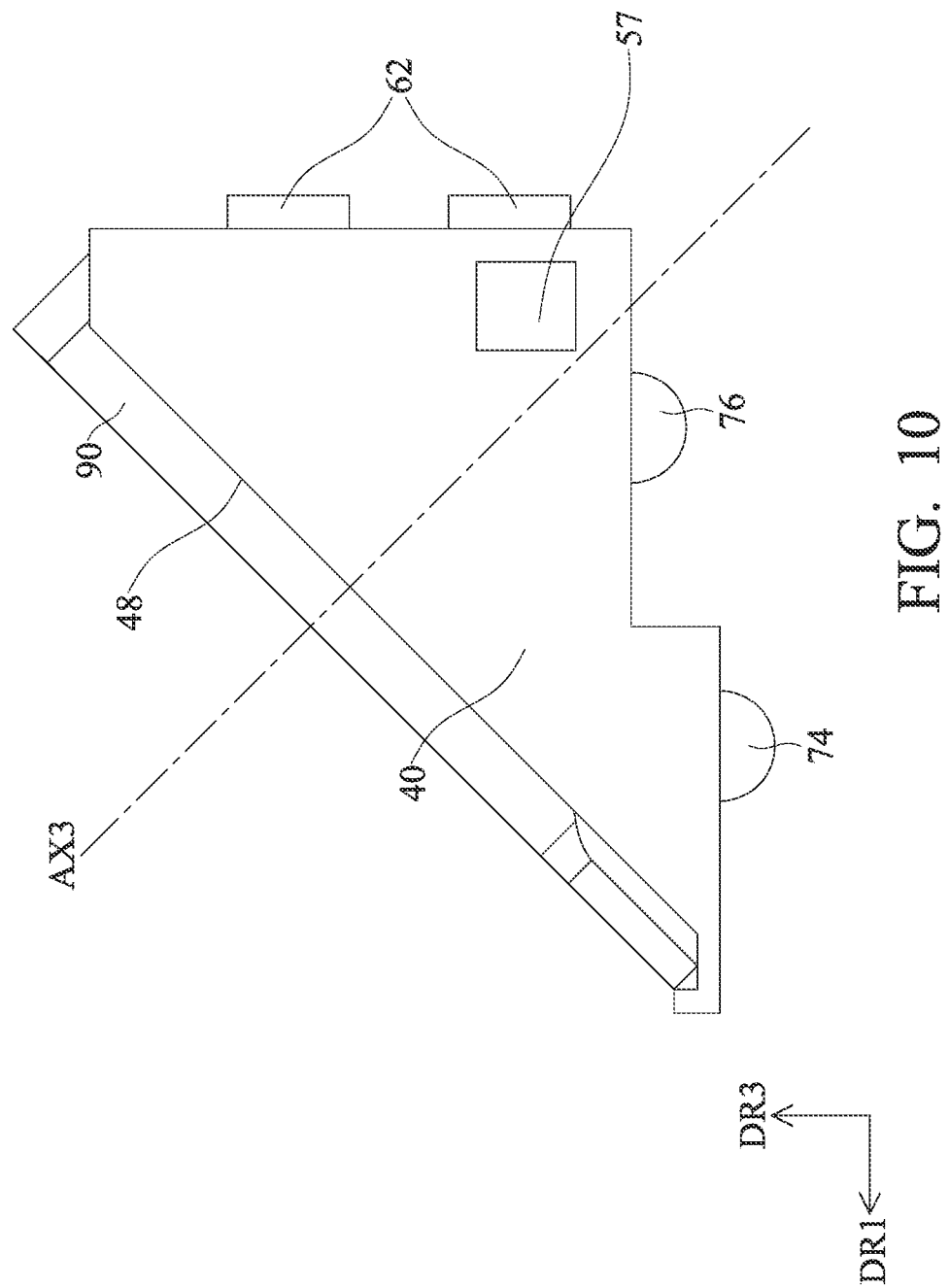

FIG. 8, FIG. 9, and FIG. 10 are schematic views of the optical element driving mechanism 1 when viewed in different directions. As shown in FIG. 8, the second movable portion 40 may have a first recess 42, a second recess 44, and a third recess 46, and the first guiding element 72, the second guiding element 74, and the third guiding element 76 may be disposed in (e.g. affixed in) the first recess 42, the second recess 44, and the third recess 46, respectively. The optical element 90 may be affixed on the second movable portion 40, and the main axis AX3 passes through the center of the optical element 90 and is perpendicular to the optical element 90. Therefore, the optical element 90 and the second movable portion 40 may arranged in a direction that the main axis AX3 extends. In some embodiments, when viewed in a direction perpendicular to the main axis AX3, the first guiding element 72, the second guiding element 74, and the third guiding element 76 do not overlap each other. In some embodiments, the main axis AX3 does not parallel to the first direction DR1 and the second direction DR2. In other words, the first axis AX1, the second axis AX2, and the main axis AX3 extend in different directions.

In some embodiments, a third magnetic element 57 may be disposed on the second movable portion 40. The third magnetic element 57 and the first magnetic element 52 may generate a force on the second movable portion 40 to affix the second movable portion 40 relative to the first movable portion 30 in the direction that the second axis AX2 extends (the second direction DR2). In some embodiments, the third magnetic element 57 and the first guiding element 72 may be disposed on opposite sides of the second movable portion 40. For example, the first magnetic element 52 and the third magnetic element 57 may repel each other to push the second movable portion 40 to a side where the first guiding element 72 is disposed on.

In some embodiments, the direction of a stabilization force provided to the first movable portion 30 from the resilient element 92 is different from the direction of the first driving force provided to the first movable portion 30 from the first driving assembly 50. For example, the stabilization force may be parallel to the third direction DR3, and the first driving force may be not parallel to the third direction DR3. Moreover, in some embodiments, the stabilization force provided to the first movable portion 30 from the resilient element 92 is different from the direction of a fixing force to the second movable portion 40 from the third magnetic element 57 and the first magnetic element 52.

Figure 11:
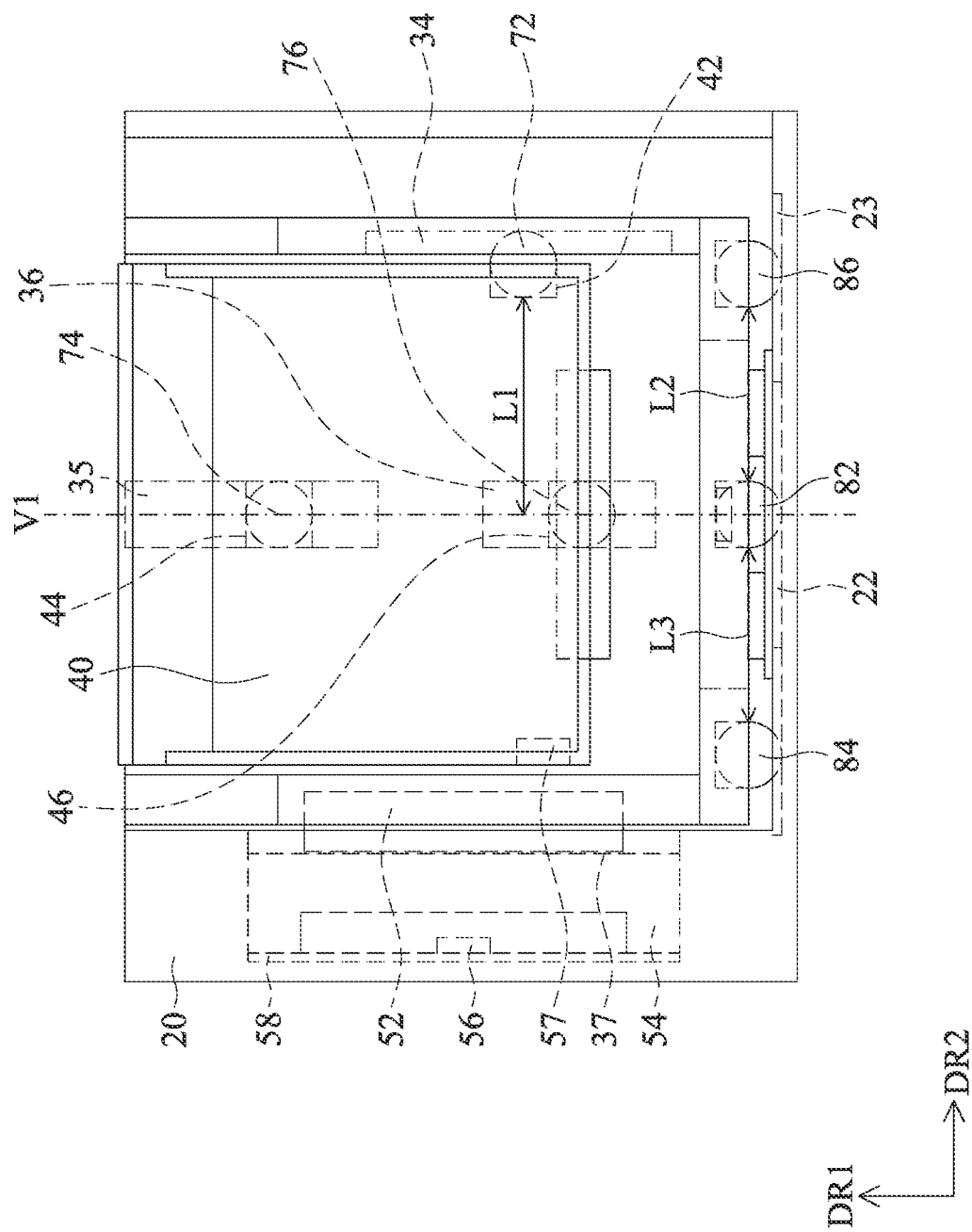
FIG. 11 and FIG. 12 are schematic views of some elements of the optical element driving mechanism when viewed in different directions.
Figure 12:
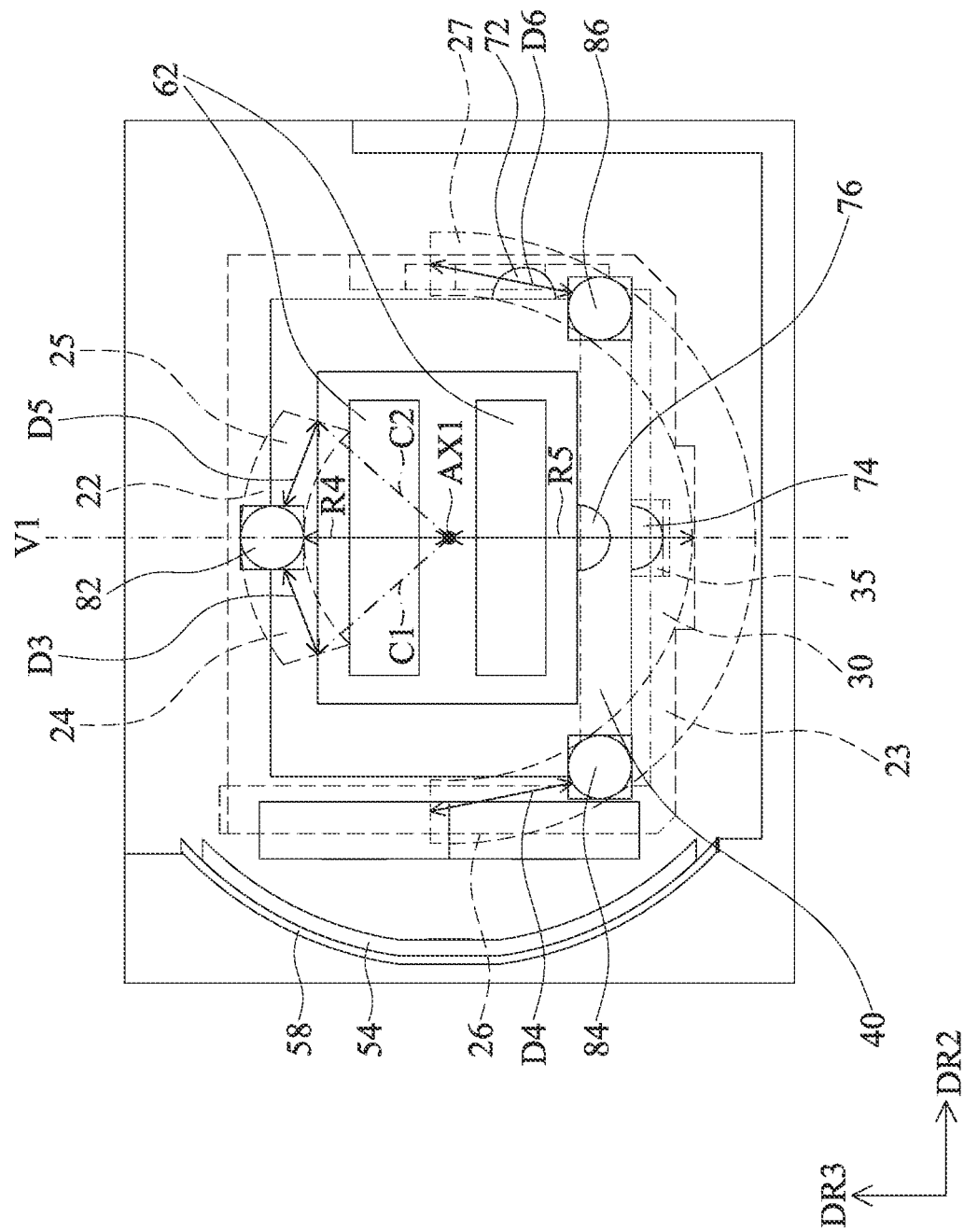

FIG. 11 and FIG. 12 are perspective schematic views of some elements of the optical element driving mechanism 1 when viewed in different directions. As shown in FIG. 11, the first guiding element 72, the second guiding element 74, and the third guiding element 76 may be disposed in the first guiding recess 34, the second guiding recess 35, and the third guiding recess 36, respectively. The first guiding element 72, the second guiding element 74, and the third guiding element 76 may be spherical. The fourth guiding element 82 may be disposed on the fourth guiding recess 22, and the fifth guiding element 84 and the sixth guiding element 86 may be disposed in the fifth guiding recess 23. The fourth guiding element 82, the fifth guiding element 84, and the sixth guiding element 86 may be spherical.

In some embodiments, the fourth guiding recess 22 and the fifth guiding recess 23 may have arc shape with the first axis AX1 as their central axis. The fourth guiding recess 22 may have a fourth radius of curvature R4, the fifth guiding recess 23 may have a fifth radius of curvature R5, and the fourth radius of curvature R4 and the fifth radius of curvature R5 are different. For example, in some embodiments, the fourth radius of curvature R4 may be less than the fifth radius of curvature R5, but it is not limited thereto. In some embodiments, the lengths of the fourth guiding recess 22 and the fifth guiding recess 23 are different, such as the length of the fourth guiding recess 22 may be less than the length of the fifth guiding recess 23, but it is not limited thereto.

In some embodiments, the fourth guiding recess 22 may include a first guiding recess endpoint 24 and a second guiding recess endpoint 25, and the fifth guiding recess 23 may include a third guiding recess endpoint 26 and a fourth guiding recess endpoint 27. The first guiding recess endpoint 24 and the second guiding recess endpoint 25 are at opposite ends of the fourth guiding recess 22, and the third guiding recess endpoint 26 and the fourth guiding recess endpoint 27 are at opposite ends of the fifth guiding recess 23.

In some embodiments, a third distance D3 is between the fourth guiding element 82 and the first guiding recess endpoint 24, a fourth distance D4 is between the fifth guiding element 84 and the third guiding recess endpoint 26, and the third distance D3 and the fourth distance D4 are different. For example, the third distance D3 may be less than the fourth distance D4. Therefore, when the first movable portion 30 rotates relative to the fixed portion F in a counterclockwise direction in FIG. 12, the fourth guiding element 82 is in contact with the first guiding recess endpoint 24 when rotating to a maximum rotational range, and the fifth guiding element 84 does not in contact with the third guiding recess endpoint 26 at this moment. In other words, the maximum rotational range of the first movable portion 30 relative to the fixed portion F in the counterclockwise direction in FIG. 12 may be defined by the fourth guiding element 82 and the first guiding recess endpoint 24.

In some embodiments, a fifth distance D5 is between the fourth guiding element 82 and the second guiding recess endpoint 25, a sixth distance D6 is between the sixth guiding element 86 and the fourth guiding recess endpoint 27, and the fifth distance D5 and the sixth distance D6 are different. For example, the fifth distance D5 may be less than the sixth distance D6. Therefore, when the first movable portion 30 rotates relative to the fixed portion F in a clockwise direction in FIG. 12, the fourth guiding element 82 is in contact with the second guiding recess endpoint 25 when rotating to a maximum rotational range, and the sixth guiding element 86 does not in contact with the fourth guiding recess endpoint 27 at this moment. In other words, the maximum rotational range of the first movable portion 30 relative to the fixed portion F in the clockwise direction in FIG. 12 may be defined by the fourth guiding element 82 and the second guiding recess endpoint 25.

In some embodiments, as shown in FIG. 12, when viewed along the first axis AX1, a first connecting line C1 passes through the first axis AX1 and the first guiding recess endpoint 24, a second connecting line C2 passes through the first axis AX1 and the second guiding recess endpoint 25, and the angle between the first connecting line C1 and the second connecting line C2 is between 10 degrees and 90 degrees. Therefore, the first movable portion 30 may have a great rotational angle relative to the fixed portion F.

As shown in FIG. 12, in some embodiments, when viewed along the first direction DR1 that the first axis AX1 extends, the first guiding element 72, the second guiding element 74, the fourth guiding element 82, the fifth guiding element 84, and the sixth guiding element 86 do not overlap each other. Therefore, the size of the optical element driving mechanism 1 in the first direction DR1 may be reduced to achieve miniaturization.

In some embodiments, as shown in FIG. 11 and FIG. 12, a first virtual plane V1 passes the first axis AX1 and has a tangent direction that is parallel to the first axis AX1. Moreover, the first virtual plane V1 passes through the second guiding element 74, the third guiding element 76, and the fourth guiding element 82. In the second direction DR2, a first length L1 is between the first guiding element 72 and the first virtual plane V1, a second length L2 is between the fifth guiding element 84 and the first virtual plane V1, a third length L3 is between the sixth guiding element 86 and the first virtual plane V1, and the first length L1 is different from the second length L2 or the third length L3. For example, the first length L1 is greater than the second length L2 or the third length L3.

In summary, an optical element driving mechanism is provided in the present disclosure. The optical element driving mechanism includes a fixed portion, a first movable portion, a second movable portion, a first driving assembly, and a second driving assembly. The first movable portion is movable relative to the fixed portion. The second movable portion is used for holding an optical element having a main axis, and is movable relative to the first movable portion. The first driving assembly is used for driving the first movable portion to move in a first dimension relative to the fixed portion, and the second driving assembly is used for driving the second movable portion to move in a second dimension relative to the fixed portion. The first dimension and the second dimension are different. Therefore, optical image stabilization function may be provided to the optical element, and miniaturization may be achieved.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
a fixed portion;
a first movable portion used for moving relative to the fixed portion and including a first plane, a second plane, and a third plane;
a second movable portion used for holding an optical element having a main axis, and is movable relative to the first movable portion;
a first driving assembly used for driving the first movable portion to move relative to the fixed portion in a first dimension; and
a second driving assembly used for driving the second movable portion to move relative to the fixed portion in a second dimension, wherein the first dimension and the second dimension are different;

wherein:
the first plane, the second plane, and the third plane face the second movable portion;
the first plane and the second plane are perpendicular;
the first plane and the third plane are perpendicular;
the second plane and the third plane are parallel;
a first recess is formed on the first plane;
a second recess is formed on the second plane;
a third recess is formed on the third plane;
the first recess has an arc-shape with a second axis as a central axis;
the second recess has an arc-shape with the second axis as a central axis;
the third recess has an arc-shape with the second axis as a central axis.

2. The optical element driving mechanism as claimed in claim 1, wherein:
a movement on the first dimension is a rotational movement of the first movable portion relative to a first axis extending in a first direction;
a movement on the second dimension is a circular movement of the second movable portion relative to the second axis extending in a second direction;
the first direction and the second direction are different;
the first axis passes through the second movable portion;
the second axis does not pass through the second movable portion;
the main axis is not parallel to the first direction;
the main axis is not parallel to the second direction;
the optical element and the second movable portion are arranged along the main axis.

3. The optical element driving mechanism as claimed in claim 2, wherein:
the first direction and the second direction are perpendicular;
the second movable portion includes a holding plane perpendicular to the main axis;
when the second movable portion moves relative to the first movable portion in the second dimension, the holding plane is perpendicular to the main axis.

4. The optical element driving mechanism as claimed in claim 3, wherein:
the first guiding recess has a first radius of curvature;
the second guiding recess has a second radius of curvature;
the third guiding recess has a third radius of curvature;
the first radius of curvature and the second radius of curvature are different;
the first radius of curvature and the third radius of curvature are different;
the second radius of curvature and the third radius of curvature are different;
when viewed along the second axis, the first guiding recess, the second guiding recess, and the third guiding recess do not overlap each other.

5. The optical element driving mechanism as claimed in claim 4, further comprising a first guiding assembly comprising a first guiding element, a second guiding element, and a third guiding element, wherein:
the first guiding element is affixed on the second movable portion and movably disposed on the first guiding recess;
the second guiding element is affixed on the second movable portion and movably disposed on the second guiding recess;

the third guiding element is affixed on the second movable portion and movably disposed on the third guiding recess.

6. The optical element driving mechanism as claimed in claim 5, wherein:
the first guiding element is spherical;
the second guiding element is spherical;
the third guiding element is spherical;
in a third direction that is perpendicular to the second plane, a distance between the second guiding element and the fixed portion is different from a distance between the third guiding element and the fixed portion.

7. The optical element driving mechanism as claimed in claim 6, wherein in the third direction, the distance between the second guiding element and the fixed portion is less than the distance between the third guiding element and the fixed portion.

8. The optical element driving mechanism as claimed in claim 7, wherein:
the first driving assembly comprises a first magnetic element and a first driving coil;
the first driving magnetic element is disposed on the first movable portion;
the first driving coil is disposed on the fixed portion;
the first driving coil has an arc-shape with the first axis as the central axis.

9. The optical element driving mechanism as claimed in claim 8, wherein:
the second driving assembly comprises a second magnetic element and a second driving coil;
the second magnetic element is disposed on the second movable portion;
the second driving coil is disposed on the first movable portion;
at least a portion of the second magnetic element protrudes from the second movable portion.

10. The optical element driving mechanism as claimed in claim 9, further comprising a third magnetic element disposed on the second movable portion used for generating a fixing force with the first magnetic element, the fixing force applies on the second movable portion to affix the position of the second movable portion relative to the first movable portion in a direction that the second axis extends.

11. The optical element driving mechanism as claimed in claim 10, wherein:
the third magnetic element and the first guiding element are disposed on opposite sides of the second movable portion;
the fixed portion further includes fourth plane;
a fourth guiding recess and a fifth guiding recess are formed on the fourth plane;
the fourth guiding recess has an arc-shape with the first axis as the central axis;
the fifth guiding recess has an arc-shape with the first axis as the central axis.

12. The optical element driving mechanism as claimed in claim 11, wherein:
the fourth guiding recess has a fourth radius of curvature;
the fifth guiding recess has a fifth radius of curvature;
the fourth radius of curvature and the fifth radius of curvature are different;
the length of the fourth guiding recess and the length of the fifth guiding recess are different.

13. The optical element driving mechanism as claimed in claim 12, further comprising a second guiding assembly comprising a fourth guiding element, a fifth guiding element, and a sixth guiding element affixed on the first movable portion, wherein:
the fourth guiding recess includes a first guiding recess endpoint and a second guiding recess endpoint;
the fifth guiding recess includes a third guiding recess endpoint and a fourth guiding recess endpoint;
a distance between the fourth guiding element and the first guiding recess endpoint is different from a distance between the fifth guiding element and the third guiding recess endpoint.

14. The optical element driving mechanism as claimed in claim 13, wherein:
a distance between the fourth guiding element and the second guiding recess endpoint is different from a distance between the sixth guiding element and the fourth guiding recess endpoint;
a first connecting line passes the first axis and the first guiding recess endpoint, a second connecting line passes the first axis and the second guiding recess endpoint, and an angle between the first connecting line and the second connecting line is between 10 degrees to 90 degrees.

15. The optical element driving mechanism as claimed in claim 14, wherein:
the distance between the fourth guiding element and the first guiding recess endpoint is less than the distance between the fifth guiding element and the third guiding recess endpoint;
the distance between the fourth guiding element and the second guiding recess endpoint is less than the distance between the sixth guiding element and the fourth guiding recess endpoint.

16. The optical element driving mechanism as claimed in claim 15, wherein:
the first guiding element, the second guiding element, the fourth guiding element, the fifth guiding element, and the sixed guiding element do not overlap each other when viewed in the first direction;
a first virtual plane is parallel to the first direction;
the first virtual plane passes the second guiding element, the third guiding element, and the fourth guiding element;
a distance between the first guiding element and the first virtual plane is different from distances between the first virtual plane to the fifth guiding element or the sixth guiding element.

17. The optical element driving mechanism as claimed in claim 16, further comprising a resilient element disposed between the first movable portion and the fixed portion used for providing a stabilize force to the first movable portion relative to the fixed portion, wherein:
the direction of the stabilize force is different from the direction of a first driving force applied to the first movable portion from the first driving assembly;
the direction of the stabilize force is different from the direction of the fixing force.

* * * * *